US012623913B2

(12) United States Patent
Marston et al.

(10) Patent No.: US 12,623,913 B2
(45) Date of Patent: May 12, 2026

(54) PROCESS FOR SELECTIVE ADSORPTION AND RECOVERY OF LITHIUM FROM NATURAL AND SYNTHETIC BRINES

(71) Applicant: ENERGYSOURCE MINERALS LLC, San Diego, CA (US)

(72) Inventors: Charles R. Marston, Midland, MI (US); Michael J. Garska, Calipatria, CA (US)

(73) Assignee: ILIAD IP COMPANY, LLC, Carlsbad, CA (US)

( * ) Notice: Subject to any disclaimer, the term of this patent is extended or adjusted under 35 U.S.C. 154(b) by 835 days.

(21) Appl. No.: 17/844,689

(22) Filed: Jun. 20, 2022

(65) Prior Publication Data

US 2022/0324717 A1      Oct. 13, 2022

Related U.S. Application Data

(60) Division of application No. 16/402,931, filed on May 3, 2019, now Pat. No. 11,365,128, which is a
(Continued)

(51) Int. Cl.
| | |
|---|---|
| *C01D 15/08* | (2006.01) |
| *B01D 15/02* | (2006.01) |
| *B01D 15/12* | (2006.01) |
| *B01D 15/18* | (2006.01) |
| *C01D 15/02* | (2006.01) |

(52) U.S. Cl.
CPC ............. *C01D 15/08* (2013.01); *B01D 15/02* (2013.01); *B01D 15/125* (2013.01); *B01D*

*15/1807* (2013.01); *C01D 15/02* (2013.01); *B01D 15/1821* (2013.01)

(58) Field of Classification Search
CPC ........ C01D 15/08; C01D 15/02; C01D 15/04; B01D 15/02; B01D 15/125; B01D 15/1807; B01D 15/1821; C01P 2006/80
See application file for complete search history.

(56) References Cited

U.S. PATENT DOCUMENTS

| | | |
|---|---|---|
| 1,154,602 A | 9/1915 | Best |
| 2,977,185 A | 3/1961 | Goodenough |
| | (Continued) | |

FOREIGN PATENT DOCUMENTS

| | | |
|---|---|---|
| CA | 3059899 A1 | 10/2018 |
| CN | 1626443 A | 6/2005 |
| | (Continued) | |

OTHER PUBLICATIONS

English Translation of WO 2012163791 A1 (Year: 2012).*
(Continued)

*Primary Examiner* — Paul A Wartalowicz
*Assistant Examiner* — Slone Elizabeth Simkins
(74) *Attorney, Agent, or Firm* — Crowe & Dunlevy, P.C.

(57) ABSTRACT

This invention relates generally to a process for selective adsorption and recovery of lithium from natural and synthetic brines, and more particular to a process for recovering lithium from a natural or synthetic brine solution by passing the brine solution through a lithium selective adsorbent in a continuous countercurrent adsorption and desorption circuit.

40 Claims, 8 Drawing Sheets

Related U.S. Application Data continuation-in-part of application No. 16/010,286, filed on Jun. 15, 2018, now Pat. No. 10,604,414.

(60) Provisional application No. 62/671,489, filed on May 15, 2018, provisional application No. 62/520,024, filed on Jun. 15, 2017.

(56) References Cited

U.S. PATENT DOCUMENTS

| | | | |
|---|---|---|---|
| 3,192,954 A | 7/1965 | Gerhold et al. | |
| 3,306,700 A | 2/1967 | Neipert et al. | |
| 4,116,856 A | 9/1978 | Lee et al. | |
| 4,116,858 A | 9/1978 | Lee et al. | |
| 4,159,311 A | 6/1979 | Bauman et al. | |
| 4,221,767 A | 9/1980 | Lee et al. | |
| 4,291,001 A | 9/1981 | Repsher et al. | |
| 4,347,327 A | 8/1982 | Lee et al. | |
| 4,348,295 A | 9/1982 | Burba | |
| 4,348,296 A | 9/1982 | Bauman et al. | |
| 4,348,297 A | 9/1982 | Bauman et al. | |
| 4,376,100 A | 3/1983 | Lee et al. | |
| 4,381,349 A | 4/1983 | Lee et al. | |
| 4,405,595 A | 9/1983 | Yang et al. | |
| 4,430,311 A | 2/1984 | Lee et al. | |
| 4,461,714 A | 7/1984 | Burba | |
| 4,472,362 A | 9/1984 | Burba | |
| 4,477,367 A | 10/1984 | Burba | |
| 4,540,509 A | 9/1985 | Burba | |
| 4,625,763 A | 12/1986 | Schick et al. | |
| 5,389,349 A | 2/1995 | Bauman et al. | |
| 5,599,516 A | 2/1997 | Bauman et al. | |
| 6,280,693 B1 | 8/2001 | Bauman et al. | |
| 6,555,078 B1 | 4/2003 | Mehta | |
| 7,824,766 B2 | 11/2010 | Eplee et al. | |
| 8,287,829 B2 | 10/2012 | Harrison et al. | |
| 8,309,043 B2 | 11/2012 | Alurralde et al. | |
| 8,741,150 B2 | 6/2014 | Chung et al. | |
| 9,024,105 B1 | 5/2015 | Corradi | |
| 9,068,247 B2 | 6/2015 | Marston et al. | |
| 9,771,632 B2 | 9/2017 | Kim et al. | |
| 10,087,083 B2 | 10/2018 | Chung et al. | |
| 10,150,056 B2 | 12/2018 | Snydacker | |
| 10,266,915 B2 | 4/2019 | Paranthaman et al. | |
| 10,385,423 B2 | 8/2019 | Chung et al. | |
| 10,478,751 B2 | 11/2019 | Chung et al. | |
| 10,626,020 B2 | 4/2020 | Reed | |
| 10,648,061 B2 | 5/2020 | Cheng et al. | |
| 10,773,970 B2 | 9/2020 | Harrison | |
| 10,850,254 B2 | 12/2020 | Boualleg et al. | |
| 11,203,542 B2 | 12/2021 | Liberatore | |
| 2003/0010776 A1 | 1/2003 | Wankat | |
| 2003/0155301 A1 | 8/2003 | Silva et al. | |
| 2007/0068873 A1* | 3/2007 | Oroskar | F16K 11/074 |
| | | | 210/659 |
| 2010/0137450 A1* | 6/2010 | Muller | C07C 45/29 |
| | | | 252/407 |
| 2011/0174739 A1 | 7/2011 | Chung et al. | |
| 2012/0160188 A1 | 6/2012 | Chen et al. | |
| 2013/0001168 A1 | 1/2013 | Kim et al. | |
| 2014/0239224 A1 | 8/2014 | Burba et al. | |
| 2018/0245180 A1* | 8/2018 | Cheng | B01J 20/28004 |
| 2019/0055134 A1 | 2/2019 | Zhu et al. | |
| 2019/0314784 A1 | 10/2019 | Lecocq et al. | |
| 2020/0010926 A1 | 1/2020 | Zhang et al. | |
| 2020/0316557 A1 | 10/2020 | Boualleg et al. | |
| 2021/0079496 A1 | 3/2021 | Harris et al. | |
| 2021/0139339 A1 | 5/2021 | Riabtsev et al. | |

FOREIGN PATENT DOCUMENTS

| | | | |
|---|---|---|---|
| CN | 1243112 C | 2/2006 | |
| CN | 201825992 U | 5/2011 | |
| CN | 102031368 B | 1/2013 | |
| DE | 102018002643 A1 | 10/2019 | |
| EP | 0103035 A1 | 3/1984 | |
| EP | 0117316 B1 | 8/1986 | |
| EP | 0094983 B1 | 12/1989 | |
| EP | 3050981 B1 | 3/2018 | |
| EP | 3086874 B1 | 11/2018 | |
| EP | 3487597 A1 | 5/2019 | |
| EP | 3382043 B1 | 8/2020 | |
| EP | 3464181 B1 | 3/2021 | |
| EP | 3290393 B1 | 1/2022 | |
| RU | 2223142 C2 | 2/2004 | |
| WO | 0230570 A1 | 4/2002 | |
| WO | 2004029490 A1 | 4/2004 | |
| WO | 2011082444 A1 | 7/2011 | |
| WO | WO-2012163791 A1 * | 12/2012 | B01J 39/05 |
| WO | 2014170863 A1 | 10/2014 | |
| WO | 2017039724 A1 | 3/2017 | |

OTHER PUBLICATIONS

"Lithium aluminum-layered double hydroxide chlorides (LDH): Formation enthalpies and energetics for lithium ion capture" (Year: 2018).*

English Translation of WO 2012163791 Fig. 5 (Year: 2012).*

"Examination Report—94(3), European Application No. 19803715. 2".

"Extended/Supplementary European Search Report, European Application No. 19803715.2".

"First Office Action, Argentina Patent Application No. P190101300".

"First Office Action, Chilean Patent Application No. 2938-2020".

"First Technical Report No. 287/2021 in Bolivian Patent Application No. SP 75-2019 dated Dec. 14, 2020".

"ISR/WO, PCT/US2019/030634".

"Response to Examination Report—94(3), European Application No. 19803715.2".

"Response to Second Examination Report—94(3), European Application No. 19803715.2".

"Second Examination Report—94(3), European Application No. 19803715.2".

"Second Office Action, Chilean Patent Application No. 2938-2020".

"Second Technical Report No. 287/2021 in Bolivian Patent Application No. SP 75-2019 dated Dec. 28, 2021".

"WO/ISR, PCT/US2019/030634".

Notice of Allowance in U.S. Appl. No. 16/797,292 dated Apr. 26, 2024.

Office Action in U.S. Appl. No. 16/797,274 dated Apr. 10, 2024.

Extended European Search Report for European Patent Application No. 24215362.5 mailed May 21, 2025 (May 21, 2025).

Notice of Allowance in Chile for related Chilean Patent Application No. 2938-2020, "Process for Selective Adsorption and Recovery of Lithium From Natural and Synthetic Brines," filed May 3, 2019, mailed Jun. 3, 2025.

Second Office Action; Argentina Patent Application No. 20190101300 dated Apr. 19, 2023.

Examination Report-94(3); European Patent Application No. 19803715.2 dated Jun. 1, 2023.

Examination Report dated Aug. 9, 2023 in corresponding Canadian Patent Application No. 3100313.

http://www.wateronline.com/doc/ion-exchange-andreverse-osmosis-a-perfect-combination-0001 (published Apr. 16, 2018; retrieved Aug. 27, 2025) (Year:2018).

Ryabstev, A. & Nemkov, N. & Kotsupalo, N. & Serikova, LA. (2004). Preparation of High-Purity Lithium Hydroxide Monohydrate from Technical-Grade Lithium Carbonate by Membrane Electrolysis. Russian Journal of Applied Chemistry. 77. 1108-1116. 10.1023/B:RJAC.0000044158.61704.93 (Year: 2004).

"Non-Final Office Action dated Jul. 25, 2025 in U.S. Appl. No. 19/031,997".

"Non-Final Office Action dated Jul. 25, 2025 in U.S. Appl. No. 19/032,006".

"Non-Final Office Action dated Sep. 8, 2025 in U.S. Appl. No. 16/797,274".

Examiner's Report dated Aug. 27, 2025, in corresponding Canadian Patent Application No. 3100313.

(56)          References Cited

OTHER PUBLICATIONS

Final Office Action for U.S. Appl. No. 16/797,274, dated Mar. 3, 2026, 46 pages.
Notice of Allowance for U.S. Appl. No. 19/031,997, dated Feb. 18, 2026, 7 pages.
Notice of Allowance for U.S. Appl. No. 19/032,006, dated Feb. 12, 2026, 7 pages.

* cited by examiner

PROCESS FOR SELECTIVE ADSORPTION AND RECOVERY OF LITHIUM FROM NATURAL AND SYNTHETIC BRINES

CROSS REFERENCE TO RELATED APPLICATIONS

This application claims priority to and is a divisional application of U.S. patent application Ser. No. 16/402,931, filed May 3, 2019, now U.S. Pat. No. 1,365,128, issued Jun. 21, 2022, which claims the benefit of U.S. Provisional Patent Application No. 62/671,489 filed on May 15, 2018 and also is a continuation-in-part of U.S. patent application Ser. No. 16/010,286 filed on Jun. 15, 2018, which claims the benefit of U.S. Provisional Patent Application No. 62/520,024 filed on Jun. 15, 2017 and the benefit of U.S. Provisional Patent Application No. 62/671,489 filed on May 15, 2018. This application incorporates each of the foregoing applications by reference into this document as if fully set out at this point.

BACKGROUND OF THE INVENTION

1. Field of the Invention

This invention relates generally to a process for selective adsorption and recovery of lithium from natural and synthetic brines, and more particular to a process for recovering lithium from a natural or synthetic brine solution by contacting the brine solution with a lithium selective adsorbent using a continuous countercurrent adsorption and desorption ("CCAD") process.

2. Description of the Related Art

Seawater contains about 0.17 mg/kg, and subsurface brines may contain up to 4,000 mg/kg, more than four orders of magnitude greater than sea water. Typical commercial lithium concentrations are between 200 and 1,400 mg/kg. In 2015, subsurface brines yielded about half of the world's lithium production.

The Salton Sea Known Geothermal Resource Area ("SSKGRA") has the most geothermal capacity potential in the United States. Geothermal energy, the harnessing of heat radiating from the beneath the Earth's crust, is a renewable resource that is capable of cost-effectively generating large amounts of power. In addition, the SSKGRA has the potential to become North America's prime sources of alkali metals, alkaline earth metals and transition metals, such as lithium, potassium, rubidium, iron, zinc and manganese.

Brines from the Salton Sea Known Geothermal Resource Area are unusually hot (up to at least 390° C. at 2 km depth), hypersaline (up to 26 wt. %), and metalliferous (iron (Fe), zinc (Zn), lead (Pb), copper (Cu)). The brines are primarily sodium (Na), potassium (K), calcium (Ca) chlorides with up to 25 percent of total dissolved solids. While the chemistry and high temperature of the Salton Sea brines have led to the principal challenges to the development of the SSKGA, lithium and other brine elements typically maintain high commodity value and are used in a range of industrial and technological applications.

The "lithium triangle" of Chile, Argentina and Bolivia is where approximately 75% of the world's lithium comes from. Chile is currently the second largest producer of lithium carbonate and lithium hydroxide, which are key raw materials for producing lithium-ion batteries, behind only Australia. Salar de Atacama is one of the hottest, driest, windiest and most inhospitable places on Earth, and the largest operations are in the shallow brine beneath the Salar de Atacama dry lakebed in Chile, which as of 2015, yielded about a third of the world's supply. The Atacama in Chile is ideal for lithium mining because the lithium-containing brine ponds evaporate quickly, and the solution is concentrated into high-grade lithium products like lithium carbonate and lithium hydroxide. Mining lithium in the salars of Chile and Argentina is much more cost-effective than hard rock mining where the lithium is blasted from granite pegamite orebodies containing spodumene, apatite, lepidolite, tourmaline and amblygonite. The shallow brine beneath the Salar de Uyuni in Bolivia is thought to contain the world's largest lithium deposit, often estimated to be half or more of the world's resource; however, as of 2015, no commercial extraction has taken place, other than a pilot plant. The mining of lithium from brine resources in the "lithium triangle" historically depends upon easy access to large amounts of fresh water and very high evaporation rates. With declining availability of fresh water and climate change, the economic advantage of conventional processing techniques is disappearing.

Fixed-bed and continuous countercurrent ion exchange ("CCIX") systems have been used to recover metals, such as nickel (Ni) and cobalt (Co), from ore leach solutions. While fixed-bed systems are generally used in recovery projects, they are known to require relatively large amounts of water and chemicals and the performance is generally weaker than CCIX systems.

Utilizing CCIX-type equipment in the adsorption of lithium from brines with lithium selective adsorbents in a CCAD circuit will bring increased process efficiency versus classical fixed-bed processing. The water and reagent efficiency of a CCAD circuit/process should be a preferred replacement for evaporation ponds in the brine mining operations in the salars of "lithium triangle", saving millions of acre feet of water from evaporative loss.

It is therefore desirable to provide an improved process for selective adsorption and recovery of lithium from natural and synthetic brines.

It is further desirable to provide a continuous countercurrent adsorption and desorption process for the selective recovery of lithium from natural and/or synthetic brines, which are normally considered economically non-viable using conventional membranes, solvent extraction, or fixed-bed arrangements of lithium selective adsorbent technologies.

It is still further desirable to provide a process for recovering lithium from a natural or synthetic brine solution by treating the brine solution with a lithium selective adsorbent in a CCIX-type system using a CCAD process.

Before proceeding to a detailed description of the invention, however, it should be noted and remembered that the description of the invention which follows, together with the accompanying drawings, should not be construed as limiting the invention to the examples (or embodiments) shown and described. Those skilled in the art to which the invention pertains will be able to devise other forms of this invention within the ambit of the appended claims.

SUMMARY OF THE INVENTION

In general, in a first aspect, the invention relates to a process for selective recovery of lithium from a feed brine solution. The process includes concentrating the lithium in the brine solution by cyclically and sequentially flowing the brine solution through a continuous countercurrent adsorption and desorption circuit to form an enhanced lithium product stream, and recovering the lithium from the enhanced lithium product stream.

The process can also include the steps of removing impurities from the brine solution to form a polished brine solution, and then concentrating the lithium in the polished brine solution by cyclically and sequentially flowing the polished brine solution through a continuous countercurrent adsorption and desorption circuit to form an enhanced lithium product stream. Lithium is then recovered from the enhanced lithium product stream.

The process can also include the step of obtaining the brine solution having lithium chloride. The lithium chloride in the brine solution can be concentrated using the continuous countercurrent adsorption and desorption circuit to form the enhanced lithium product stream, and then, the lithium chloride can be selectively converted to lithium carbonate, lithium hydroxide, or both.

The continuous countercurrent adsorption desorption circuit can have a plurality of process zones, with each of the process zones having an adsorbent bed or column containing a lithium selective adsorbent. The lithium selective adsorbent can be a lithium alumina intercalate prepared from hydrated alumina, a lithium aluminum layered double hydroxide chloride, a layered double hydroxide modified activated alumina, a layered double hydroxide imbibed ion exchange resin or copolymer or molecular sieve or zeolite, layered aluminate polymer blends, a lithium manganese oxide, a titanium oxide, an immobilized crown ether, or a combination thereof. The process zones can include a brine displacement zone positioned upstream with respect to fluid flow of a brine loading zone, which is positioned upstream with respect to the fluid flow of and in fluid communication with an entrainment rejection zone, which is positioned upstream with respect to fluid flow of and in fluid communication with an elution zone, which is in fluid communication with the brine displacement zone. The brine solution is passed through the loading zone for a predetermined amount of contact time.

The process can also include dewatering the enhanced lithium product stream using a membrane separation, such as reverse osmosis or nano-filtration, in order to produce a high lithium concentration, enhanced lithium product stream and a recycle eluant solution. The enhanced lithium product stream, the high lithium concentration, enhanced lithium product stream or both can then be passed or provided to a lithium solvent extraction and electrowinning process, a solvent extraction and membrane electrolysis process, or a recovery process for production of high purity lithium hydroxide and lithium carbonate for battery production.

The brine solution can be a natural brine, a synthetic brine, or a combination thereof, such as a continental brine, a geothermal brine, an oil field brine, a brine from hard rock lithium mining, or a combination thereof.

In general, in a second aspect, the invention relates to a continuous countercurrent adsorption desorption circuit configured for the selective adsorption and recovery of lithium from a lithium-rich brine solution. The circuit has a plurality of process zones, with each of the process zones comprising a plurality of adsorbent beds or columns having a lithium selective adsorbent. The process zones include a brine displacement zone positioned upstream with respect to fluid flow of a brine loading zone, which is positioned upstream with respect to the fluid flow of and in fluid communication with an entrainment rejection zone. The entrainment rejection zone is positioned upstream with respect to fluid flow of and in fluid communication with an elution zone, and the elution zone in fluid communication with the brine displacement zone.

The lithium-rich brine solution can be a natural brine, a synthetic brine, or a combination thereof, such as a continental brine, a geothermal brine, an oil field brine, a brine from hard rock lithium mining, or a combination thereof. The lithium selective absorbent may be a lithium alumina intercalate prepared from hydrated alumina, a lithium aluminum layered double hydroxide chloride, a layered double hydroxide modified activated alumina, a layered double hydroxide imbibed ion exchange resin or copolymer or molecular sieve or zeolite, layered aluminate polymer blends, a lithium manganese oxide, a titanium oxide, an immobilized crown ether, or a combination thereof.

In general, in a third aspect, the invention relates to a continuous adsorption and desorption process for recovery of lithium from a brine solution. The process includes the steps of:

a) displacing a lithium-containing feed brine solution from a freshly loaded adsorbent bed or column using a lithium product eluate and passing a displacement liquor solution to a brine feed inlet of a lithium adsorption zone;

b) incorporating the displacement liquor solution into the feed brine solution to form a combined liquor/feed brine solution;

c) passing the combined liquor/feed brine solution through a lithium loading zone where lithium is adsorbed on one or more loading adsorbent beds or columns and forming a lithium depleted brine raffinate;

d) displacing an eluate solution from the loading adsorbent beds with a portion of the lithium depleted brine raffinate from the lithium loading zone and into an elution zone;

e) flowing a fresh eluant solution through the elution zone stripping a portion of lithium adsorbed on the adsorbent beds or columns; and f) collecting a portion of the eluant having high lithium concentration as an enhanced lithium product solution.

In fourth aspect, the invention relates to a continuous adsorption and desorption process for recovery of lithium from a feed brine solution. An eluant solution passes through an elution zone and strips most of the lithium from the lithium loaded adsorbent. A portion of the lithium product solution is captured as the purified lithium concentrate, and a second portion is employed to displace latent brine from freshly loaded adsorbent. A portion of the lithium product solution along with the displaced brine is routed to the brine feed inlet and this recirculation of lithium via the displacement stream increases the effective lithium concentration in the brine feed stream. The brine feed solution, along with the recycled product and displaced brine, passes through a plurality of adsorbent beds containing lithium selective adsorbent such that lithium is selectively loaded onto the adsorbent and produces a lithium-depleted brine raffinate. A portion of the lithium-depleted brine raffinate is introduced to the elution zone, displacing latent eluant solution so it is not lost to raffinate when the first adsorbent bed in the elution zone eventually transitions from the elution zone to the loading zone. In addition, the process can include membrane dewatering of the lithium product eluate to concentrate the product lithium and replenish the low concentration lithium eluant solution.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
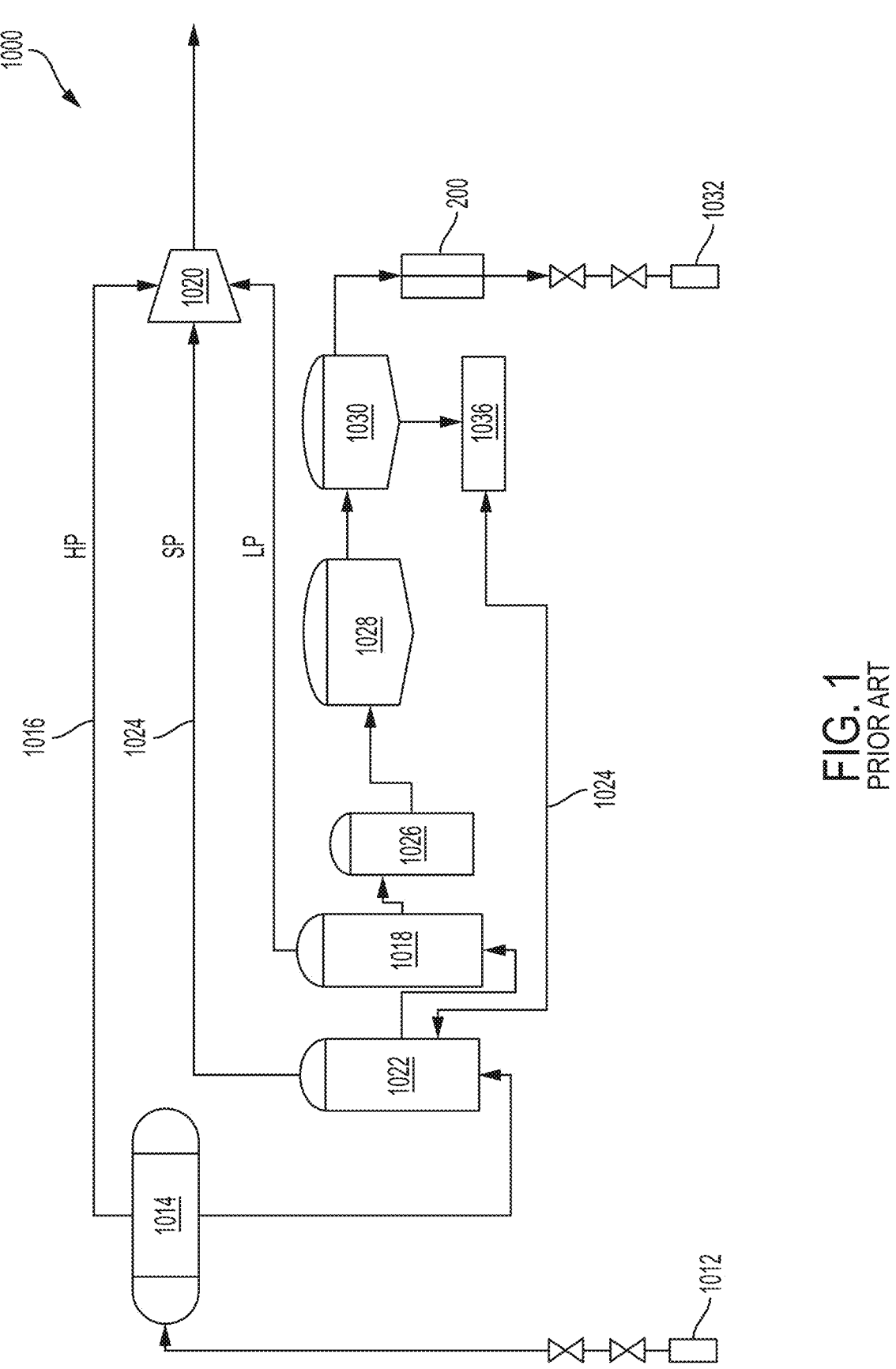
FIG. 1 is a process diagram of an example of a known crystallizer reactor clarifier process for power plant operations in the Salton Sea Known Geothermal Resource Area.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments so described.

This invention relates generally to a process for selective adsorption and recovery of lithium from natural and synthetic brines using CCAD. While the invention is particularly suited for geothermal brines, the source of the feed brine is not so limited. The feed brine source can be from any lithium brine deposit, such as continental sources, geothermal sources, oil field sources, or brine from hard rock lithium mining activity. The feed brine may be subject to a variety of preliminary treatment steps including the removal of solids and certain problem metals or metals of commerce (e.g., iron, manganese, zinc, silicon, etc.). Just prior to treatment by the inventive process, the feed brine preferably has a pH between about 5.0 and about 7.0. The feed brine generally includes large quantities of chloride salts of sodium, potassium, and calcium. Higher temperature brines (about 50° C. to about 100° C.) improve the kinetic response of the lithium selective adsorbent; however, lower temperature brines can also be successfully treated (about 5° C. to about 50° C.) using the inventive process.

As generally illustrated in FIG. 1, existing power plant operations 1000 generally involve a liquid brine flow from geothermal production wells 1012 that is partially flashed into steam due to pressure losses as the liquid brine makes its way up the production well casing. The two-phase mixture of brine and steam is routed to a high-pressure separator 1014 where the liquid brine and high pressure steam are separated. High pressure steam 1016 is routed from the separator 1014 to a centrifugal type steam scrubber (not shown) that removes brine carryover from the steam, and from there the scrubbed high pressure steam 1016 is routed to the turbine generator 1020. The liquid brine from the high-pressure separator 1014 is flashed into a standard-pressure crystallizer 1022, and the standard pressure steam 1024 from the standard-pressure crystallizer 1022 is passed through a steam scrubber (not shown) and then the scrubbed standard pressure steam 1024 is routed to the turbine 1020. Precipitated solids from the clarifiers are mixed with the brine in the standard-pressure crystallizer 1022 and contact with the scaling materials, which reduces the scaling tendency in brine significantly.

A brine slurry mixture from the standard-pressure crystallizer 1022 is flashed into a low-pressure crystallizer 1018. Low pressure steam 1025 from the low-pressure crystallizer 1018 flows through a steam scrubber (not shown) and then either to a low-pressure turbine or to the low-pressure side of a dual entry turbine 1020. The brine slurry mixture is flashed to atmospheric pressure in an atmospheric flash tank 1026 and then flows into the clarifiers.

A primary clarifier 1028 comprising an internally recirculating reactor type clarifier precipitates silica down to close to equilibrium values for the various scaling constituents at the operating temperature of the brine, e.g., approximately 229° F. Primary Clarifier Overflow ("PCO") refers to the clarified brine flowing out of the primary clarifier 1028, and Primary Clarifier Underflow ("PCU") refers to the slurry flowing out of the bottom of the primary clarifier 1028. The precipitated solids are flocculated and settled to the bottom of the primary clarifier tank 1028. A relatively clear brine PCO passes from the primary clarifier 1028 to a secondary clarifier 1030 that removes additional suspended solids from the brine. Secondary Clarifier Overflow ("SCO") 1038 refers to the clarified brine flowing out of the secondary clarifier 1030, and Secondary Clarifier Underflow ("SCU") refers to the slurry flowing out of the bottom of the secondary clarifier 1030.

Flocculent and scale inhibitor are added between the primary clarifier 1028 and the secondary clarifier 1030 to enhance solids settling and to prevent the precipitation of radioactive alkaline earth salts. The stable SCO 1038 from the secondary clarifier 1030 is pumped into injection wells 1032. A portion of the precipitated solids from the PCU and the SCU is recycled upstream to the standard-pressure crystallizer 1022 as seed material 1034. Accumulated solids in both the primary clarifier 1028 and the secondary clarifier 1030 are routed to a horizontal belt filter ("HBF") 1036 for solids removal.

The HBF 1036 separates liquid from the solids in the slurry from the PCU and the SCU. The liquid can be separated from the solids by vacuum and passes through a filter cloth that rests on top of the carrier belt. The first stage of the HBF is a pH 1.0 acid wash of the slurry with hydrochloric acid to remove any lead precipitates from the filter cake. The second stage is a pH 9.5 condensate water wash to neutralize any residual acid in the filter cake. The third stage of the HBF steam dries the filter cake. The filter cake is transported to a local landfill for disposal.

The silica and iron concentrations in the brine at the PCO, SCO and injection wells of the power plant operations are summarized as follows in Table 1:

TABLE 1

| Location | Si as SiO$_2$ (mg/kg) | Fe (mg/kg) | As (mg/kg) | K (mg/kg) | Zn (mg/kg) | Mn (mg/kg) | Li (mg/kg) |
|---|---|---|---|---|---|---|---|
| PCO | 167 ± 25 | 1,579 ± 123 | 17.0 ± 4.0 | 20,600 ± 2,200 | 625 ± 42 | 1,705 ± 101 | 264 ± 24 |
| SCO | 159 ± 19 | 1,560 ± 88 | 16.9 ± 4.0 | 20,600 ± 2,600 | 639 ± 41 | 1,693 ± 134 | 265 ± 23 |
| Injection Wells | 160 ± 19 | 1,557 ± 87 | 16.9 ± 4.0 | 20,400 ± 2,500 | 621 ± 45 | 1,696 ± 92 | 265 ± 22 |

The polished brine 1038 that exits the SCO from the power plant 1000 with reduced amounts of scaling constituents is well suited for mineral extraction, and rather than injecting the polished brine 1038 into the injection well 1032, it is made available to the system and process 200 and/or to the CCAD process 400 for selective recovery of lithium and/or other minerals from the polished brine 1038.

Recovery of Lithium Carbonate

Figure 2:
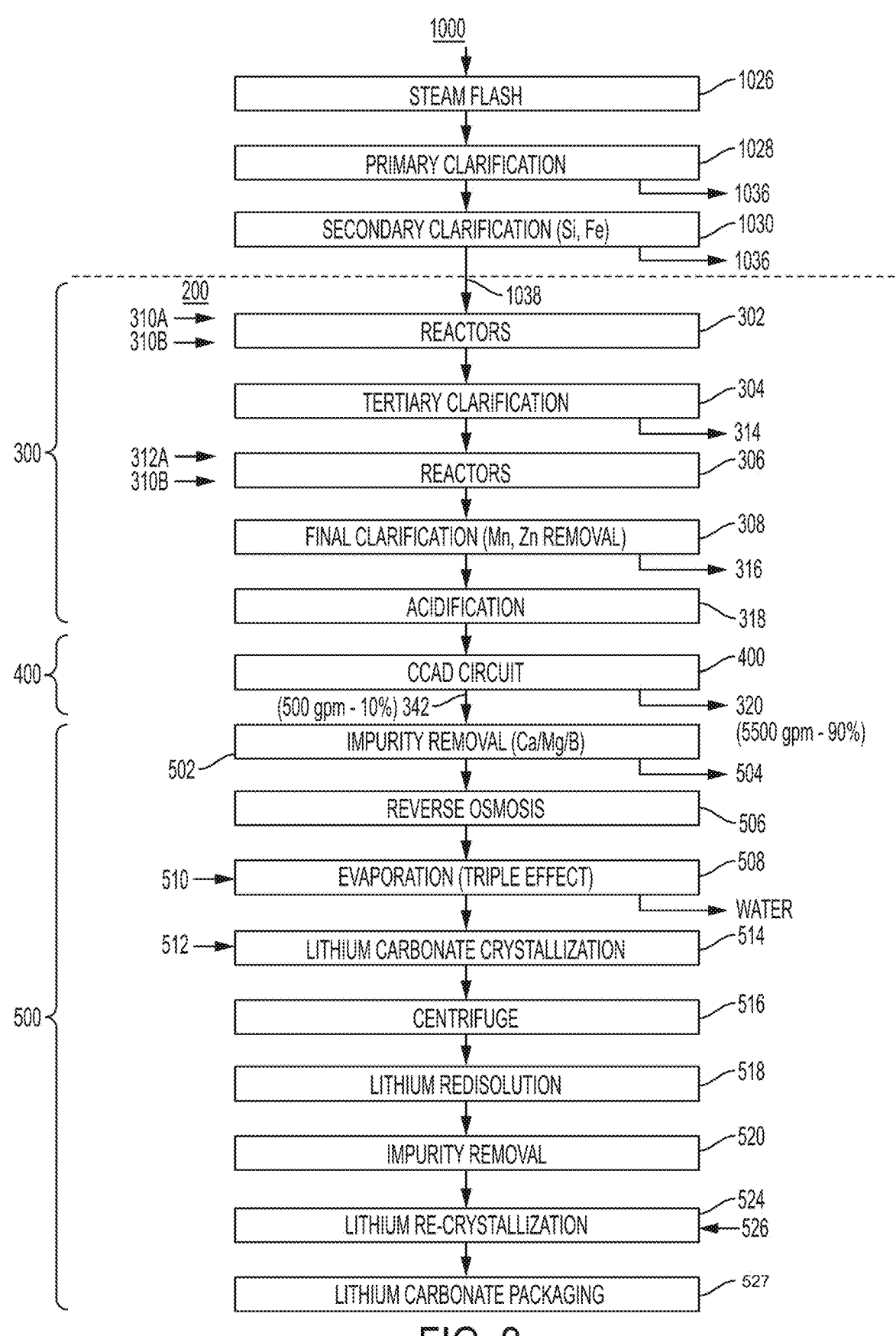
FIG. 2 is a flow chart of an example of a process for recovery of lithium carbonate in accordance with an illustrative embodiment of the invention disclosed herein.

As illustrated in FIG. 2, a feed brine, such as a geothermal brine or the brine 1038 that exits the SCO from the power plant 1000 having reduced amounts of scaling constituents passes to the system and process 200 for mineral and/or lithium extraction. The feed brine is passed into the impurity removal circuit 300 having a first set of reaction tanks 302 and a first clarifier 304 to remove iron and silica followed by a second set of reaction tanks 306 and a second clarifier 308 to remove manganese and zinc primarily. A first or iron/silica precipitation stage 300A of the impurity removal circuit 300 includes adding limestone 310A and injecting air 310B into brine. The air causes the dissolved iron to oxidize and the pH to drop. A low pH solution reduces the rate of reaction; therefore, limestone is used to neutralize this effect and maintain the pH around 5.5. The first clarifier 304 is positioned downstream of the first set of reaction tanks 302 to settle out the silica and iron in the brine. The precipitated solids are settled to the bottom of the first clarifier tank 304. The first stage 300A of the impurity removal circuit 300 reduces the iron concentration in the brine overflow from about 1,600 part per million (ppm) down to less than about 5 ppm and reduces the silica concentration in the brine overflow from about 60 ppm down to less than about 5 ppm. A relatively clear brine overflow passes from the first clarifier 304 to a second or zinc/manganese precipitation stage 300B of impurity removal circuit 300.

The second stage 300B of the impurity removal circuit 300 includes adding limestone 312A and/or lime 312B to the brine in the second set of reaction tanks 306. This causes the brine pH to elevate to around 8. The second clarifier 308 is positioned downstream of the second set of reaction tanks 306 and allows the metals as oxides and/or hydroxides (primarily zinc and manganese) to settle. During the second stage 300B of the impurity removal circuit 300, the manganese concentration in the brine is reduced from about 1700 ppm down to less than about 10 ppm, while zinc concentration is reduced about 600 ppm down to less than 5 ppm in the second stage 300B of the impurity removal circuit 300. Accumulated solids in the first clarifier 304 and the second clarifier 308 are respectively routed to a pneumapress filter HBF to prepare an Fe/Si filter cake 314 and a Mn/Zn filter cake 316.

Acid is then added 318 to the brine from the second clarifier 308 to reduce the pH back down to between about 4.5 and about 6.0, with a brine temperature between about 5° C. and about 100° C., which is suitable for the CCAD circuit 400. The dissolved solids in the polished brine at this point in the process comprise primarily salts (as chlorides) with high concentrations of sodium, potassium, and calcium. The lithium concentration is comparatively low at only ±250 ppm.

The polished brine (stream 54 in FIG. 4A) can then passed to the CCAD circuit 400, which concentrates the lithium in the polished brine by approximately 10 times and simultaneously separates the lithium from the other salts (calcium is of particular concern for downstream operations). The target result is an enhanced lithium chloride product stream 342 in FIGS. 2 and 3 (stream 57 in FIG. 4A) (stream 417 or stream 420 in FIG. 5) (with some residual impurities) of around approximately 2,500 to 3,000 ppm lithium. The residual brine can be returned for reinjection through injection wells 320.

If the inventive CCAD system is used with salar, continental or other non-geothermal brines, the brine feedstock can be passed directly to the CCAD circuit 400 with minimal pretreatment such as granular media filtration (GMF) and, if necessary, residual organic removal. Salar or continental brines with low iron and silica content may require only minimal pretreatment before being passed to the CCAD circuit 400 for concentrating lithium when compared to brines from the Salton Sea Known Geothermal Resource Area (SSKGRA). The pretreatment process may include dilution with water to prevent solids precipitating from brines that are close to saturation. In addition, GMF can be used to reduce total suspended solids (TSS) to below 10 ppm before introducing the brine solution. Oil field brines may require pretreatment processing to remove any residual organic material before being passed to the CCAD circuit 400. The bulk of the organic material can be removed by a device such as an API oil-water separator. Any remaining organic materials can be removed with a mixed bed GMF that includes activated carbon as part of the mixed bed.

Figure 5:
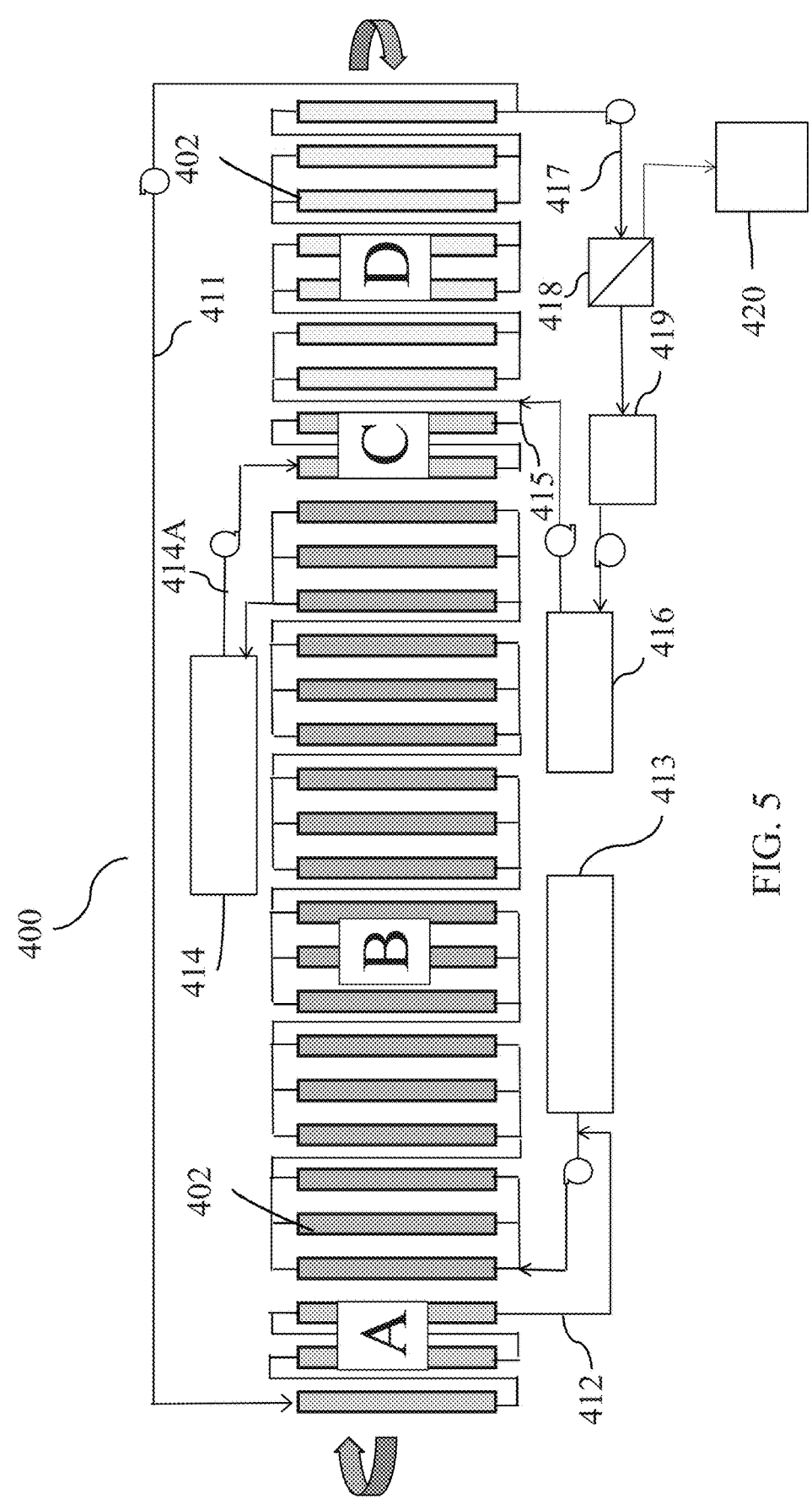
FIG. 5 is a flow chart diagram of an example of a CCAD lithium recovery unit in accordance with an illustrative embodiment of the invention disclosed herein.

Referring now to FIG. 5, the CCAD circuit 400 includes a series of sequential steps in a cyclic process. The CCAD circuit 400 has a plurality of adsorption beds or columns 402 each containing a lithium selective adsorbent. The adsorption beds 402 are sequentially subjected to individual process zones (A, B, C, D) as part of the CCAD circuit 400. Each of the process zones A, B, C, and D includes one or more of the adsorbent beds 402 configured in parallel, in series, or in combinations of parallel and series, flowing either in up flow or down flow modes. The process zones of the CCAD circuit 400 include an adsorption displacement zone A, an adsorption loading zone B, an entrainment rejection (ER) zone C, and an elution zone D. Brine fluid flow through the CCAD circuit 400 is controlled by pumping flow rates and/or predetermined indexing of a central multi-port valve system or of the adsorbent beds 402, creating a process where the adsorption beds 402 continually cycle through the individual process zones A, B, C and D.

In order to eliminate the possibility of residual feedstock brine 413 and brine salts from entering the elution zone D, an elution volume of feed brine 412 is displaced from the adsorbent bed(s) 402 of the brine displacement zone A using a portion of high lithium concentration product eluate 411 from the elution zone D. The elution volume of displacement feed brine 412 drawn from the elution zone D into the brine displacement zone A is at least enough to displace one adsorbent bed void fraction during an index time (the time interval between rotary valve indexes).

The feedstock brine 413, which can be the polished geothermal brine (stream 54 in FIG. 4A) or a salar, continental or other non-geothermal feedstock brine, is pumped to the adsorbent bed(s) 402 in the loading zone B with a predetermined elution time sufficient to completely or almost completely exhaust the lithium selective adsorbent, and the depleted brine exiting the loading zone B is sent to raffinate 414. The loading zone B is sized such that under steady state operation of the CCAD circuit 400, the complete lithium adsorption mass transfer zone is captured within the zone B. The steady state operation treats the feedstock brine 413 so that the maximum lithium loading is achieved without significant lithium leaving with the lithium depleted raffinate 414 as tails.

Next, a portion of raffinate 414A is pumped to the entrainment rejection (ER) zone C to displace latent eluate solution 415, which is carried forward as entrained fluid within the column transitioning from the loading zone C into the elution zone D in the cyclic process, back to the inlet of the elution zone D. The elution volume of the displacement fluid 414A drawn from the raffinate 414 to displace latent eluate solution 415 back into the ER zone C is at least enough to displace one adsorbent bed void fraction during the rotary valve index time.

Then, an eluant (stripping solution) 416 is pumped countercurrent to the adsorbent advance (fluid flow is illustrated as right to left, while the adsorbent beds movement is illustrated as left to right) into the elution zone D to produce an enhanced lithium product stream 417. Eluant 416 comprises a low concentration lithium product eluant (as neutral salts, generally lithium chloride) in water at a concentration of up to about 1000 mg/kg lithium or from about 0 mg/kg to about 1000 mg/kg lithium and at temperatures of about 5° C. to about 100° C. Properly tuned, the enhanced lithium product stream 417 will have a lithium concentration 10- to 20-fold that of the eluant 416 and greater than 99.8% rejection of brine hardness ions and most other brine components. The portion of high lithium concentration product eluate 411 that is recycled and displaces the displacement feed brine 412 from the displacement zone A is enough fluid to completely displace brine salts from the adsorbent before the adsorbent enters the elution zone D. This means that the displacement feed brine 412 may be recycled and introduced to the loading zone B with the feedstock brine 413. Depending on the tuning parameters of the CCAD circuit 400, the low lithium concentration in the recycled displacement feed brine 412 could significantly increase the effective concentration of lithium entering the loading zone B. This enhanced feed concentration results in significantly increased lithium capacity and greater lithium recovery efficiency, especially in the case of feedstock brines with low lithium concentrations (under 200 mg/kg).

An optional membrane separation 418 can be inserted into stream 417, which includes but is not limited to, reverse osmosis or nano-filtration, to dewater and concentrate the lithium product solution 417 producing a product eluate with higher lithium concentration 420, while producing a recycle stream 419 suitable for use as make-up for fresh eluant 416. The optional membrane dewatering of the enhanced lithium product stream 417 would recycle a portion of the water 419 used in the preparation of the eluant solution 416. Depending on the permeability of the membrane, a portion of the lithium could pass through the membrane without passing multivalent brine components and become the lithium make-up for fresh eluant 416.

Figure 3:
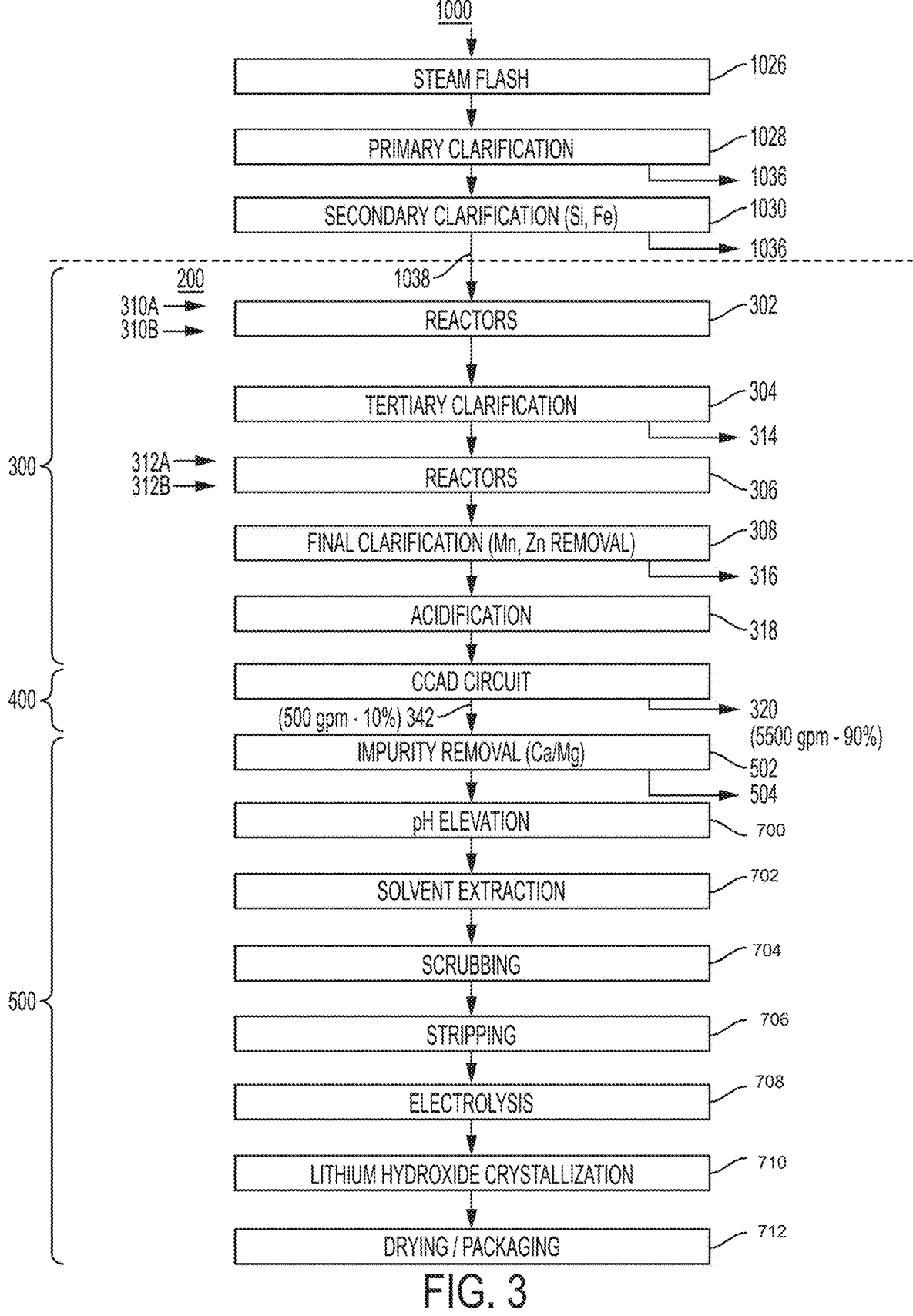
FIG. 3 is a flow chart of an example of a process for recovery of lithium hydroxide in accordance with an illustrative embodiment of the invention disclosed herein.
Figure 4A:
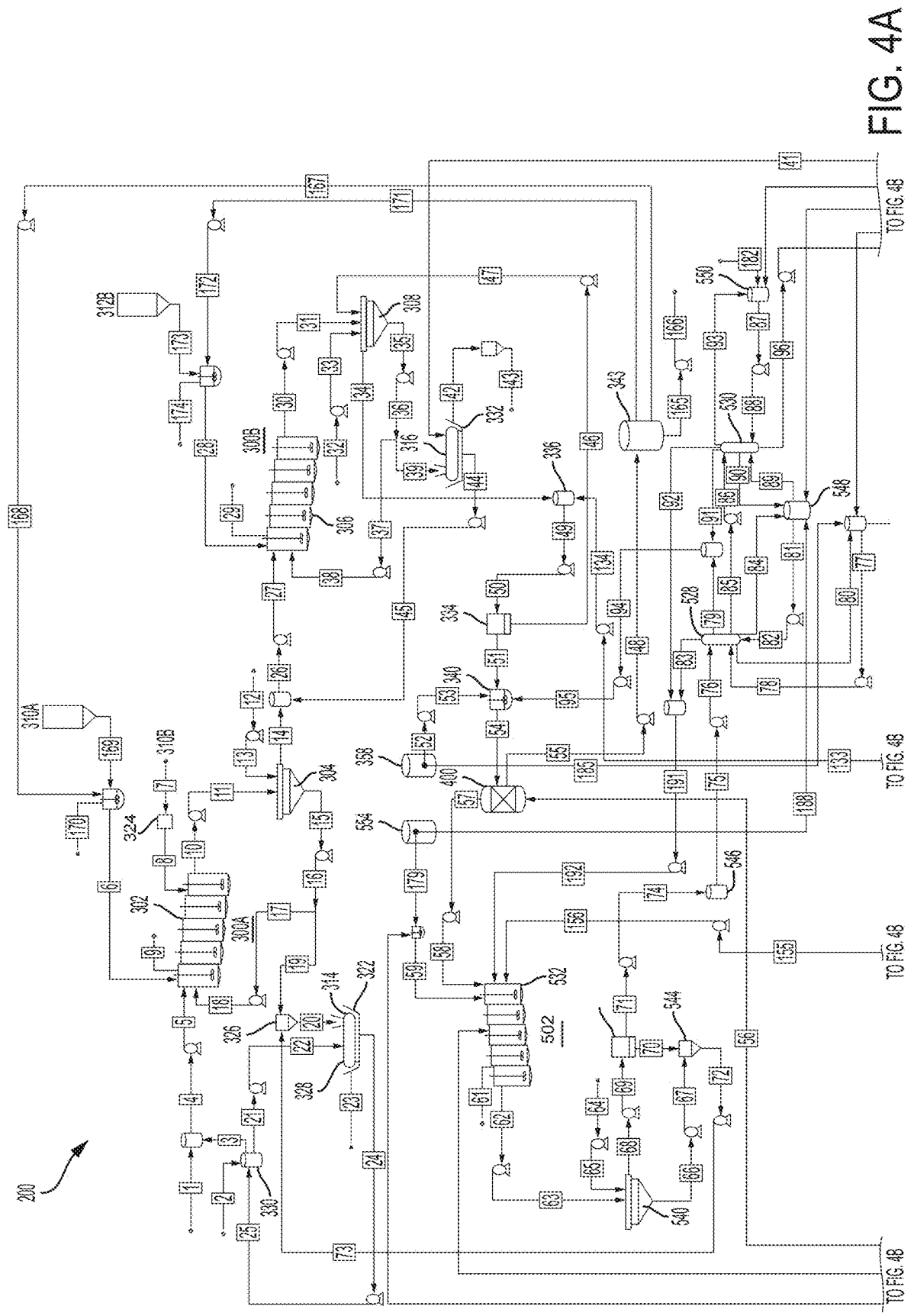
FIG. 4A is a process flow diagram of a system and process for recovery of select minerals and lithium in accordance with an illustrative embodiment of the invention disclosed herein.

The CCAD circuit 400 recovers between about 90% and about 97% of the lithium from the feed brine and produces the enhanced lithium chloride product stream 342 in FIGS. 2 and 3 (stream 57 in FIG. 4A) (stream 417 or stream 420 in FIG. 5) having a concentration 10- to 50-fold that of the feed brine (e.g., polished brine stream 54 in FIG. 4A or other natural or synthetic brine feedstock) with a greater than 99.9% rejection of brine hardness ions. The production of this high purity lithium, directly from brine, without the need for extra rinse water, is an extremely cost-effective process of obtaining commercially valuable and substantially pure lithium chloride, suitable for conversion to battery grade carbonate or hydroxide.

The lithium selective adsorbent in the adsorbent beds 402 can be lithium alumina intercalates prepared from hydrated alumina, lithium aluminum layered double hydroxide chloride (LDH), LDH modified activated alumina, LDH imbibed ion exchange resins or copolymers or molecular sieves or zeolites, layered aluminate polymer blends, lithium manganese oxides (LMO), titanium oxides, immobilized crown ethers, or other lithium ion selective binding material.

The process for selective adsorption and recovery of lithium from natural and synthetic brines disclosed herein is further illustrated by the following examples, which are provided for the purpose of demonstration rather than limitation.

An exemplary CCAD circuit 400 was configured in general accordance with FIG. 5 using thirty (30) individual adsorption columns 402 arranged in a rotating carrousel pilot skid with a central rotary valve design with each column having a 1.0 inch inner diameter and 35 inches in length, each packed with 355 mL of macroporous resin imbibed with lithium alumina intercalate. All metal analysis was performed using inductively coupled plasma (ICP) analysis. The adsorbent bed advance rate was set to 4.33 minutes per forward step of the rotating carrousel. The turret of adsorption columns was maintained in an enclosure at 70-80° C. All feed solutions were introduced to the circuit at 85° C. The brine displacement zone (zone A) comprised four (4) columns in series and the flow rate was set at 80 mL/min. The adsorption zone (zone B) comprised six (6) sets of three (3) parallel columns arranged in series. The feed brine comprised a treated Salton Sea geothermal brine at pH 5.6 where the silica, iron, manganese, and zinc had been selectively removed in a pretreatment protocol and the brine flow rate was set at 660 mL/min, specific gravity 1.18. Next the ER zone (zone C) comprised two (2) columns in series and the lithium depleted brine raffinate entered the ER zone at a flow rate of 50 mL/min. The elution zone (zone D) comprised three (3) pairs of parallel columns arranged in series and was fed by 80 mL/min of low concentration lithium (300 mg/L) in water as eluate. The product lithium was taken from the last of the three (3) pairs of parallel columns at a flow rate of 53 mL/min and the remainder of the flow entered zone A to displace brine to the brine feed port at the flow rate of 80 mL/min (as stated above).

The CCAD circuit 400, after achieving steady state operation, provided excellent results for lithium recovery. The feed brine had an average lithium concentration of 216 mg/L while the lithium product stream had an average lithium concentration of 2,500 mg/L, and as such, in this example, greater than 93% of the lithium from the feed brine was recovered.

In addition, the inventive process provides excellent results for the preparation of a lithium chloride product having low calcium and magnesium concentrations, which is particularly suited as a feedstock for a solvent extraction and electrowinning (SX/EW) process, a solvent extraction and membrane electrolysis (SX/EL) process, or other recovery technology process for production of high purity lithium hydroxide and lithium carbonate for battery production. The feed brine contained 27,880 mg/L of calcium yet the lithium product stream contained only 300 mg/L of calcium, representing a 99.98% rejection of calcium from the feed brine to the lithium product stream.

Another exemplary CCAD circuit 400 was configured in general accordance with FIG. 5 using thirty (30) individual adsorption columns arranged in a rotating carousel pilot skid with a central rotary valve design with each column having a 2.0 inch inner diameter and 48 inches in length, each packed with 2.8 L of macroporous resin imbibed with lithium alumina intercalate. All metal analysis was performed using ICP analysis. The adsorbent bed advance rate was set to 6.00 minutes per forward step of the rotating carousel. The turret of columns was maintained in an enclosure at about 40° C. All feed solutions were introduced to the system at 77° C. The brine displacement zone A comprised four (4) columns in series and the flow rate was set at 340 mL/min. The adsorption zone B comprised six (6) sets of three (3) parallel columns arranged in series. The feed brine comprised treated Salton Sea geothermal brine at pH 5.6 where the silica, iron, manganese, and zinc had been removed in a pretreatment protocol and the brine flow rate was set at 3,050 mL/min, specific gravity 1.18. Next the ER zone C comprised two (2) columns in series and the lithium depleted brine raffinate entered the ER zone C at a flow rate of 250 mL/min. The elution zone D comprised three (3) pairs of parallel columns arranged in series and was fed by 580 mL/min of low concentration lithium (100 mg/kg) in water as eluate. The product lithium was taken from the last of the three (3) pairs of parallel columns at a flow rate of 240 mL/min and the remainder of the flow entered the zone A to displace brine to the brine feed port at the flow rate of 340 mL/min.

In this example, the CCAD circuit 400, after achieving steady state operation, provided excellent results for lithium recovery. The feed brine had an average lithium concentration of 240 mg/kg while the lithium product stream had an average lithium concentration of 3,270 mg/kg, and the average concentration of lithium in the raffinate was 8 mg/kg, as such, in this example, lithium recovery was greater than 93% of the lithium from the feed brine. Table 2 below shows the steady state performance of the inventive process as exemplified in this example. The CCAD product stream was 7.9% of the volume of the treated Salton Sea Brine feed stream. Quantities of metals are expressed in mg/kg and are corrected for differences in specific gravity of feed brine vs CCAD product.

TABLE 2

| | CCAD Product Volume = 9.3% of Feed Brine | | | | |
| Element | Feed Brine (mg/kg) | Feed Brine (mg/L) | CCAD Product (mg/L) | % Reporting to CCAD Product | % Rejection from CCAD Product |
| --- | --- | --- | --- | --- | --- |
| Li | 240 | 283 | 3,250 | 93.70% | 6.3% |
| Ca | 43,130 | 50,893 | 407 | 0.09% | 99.91% |
| Mg | 86.4 | 102 | 1.64 | 0.17% | 99.83% |
| Na | 64,760 | 76,417 | 117 | 0.02% | 99.98% |
| K | 19,180 | 22,632 | 39 | 0.02% | 99.98% |

Figure 7:
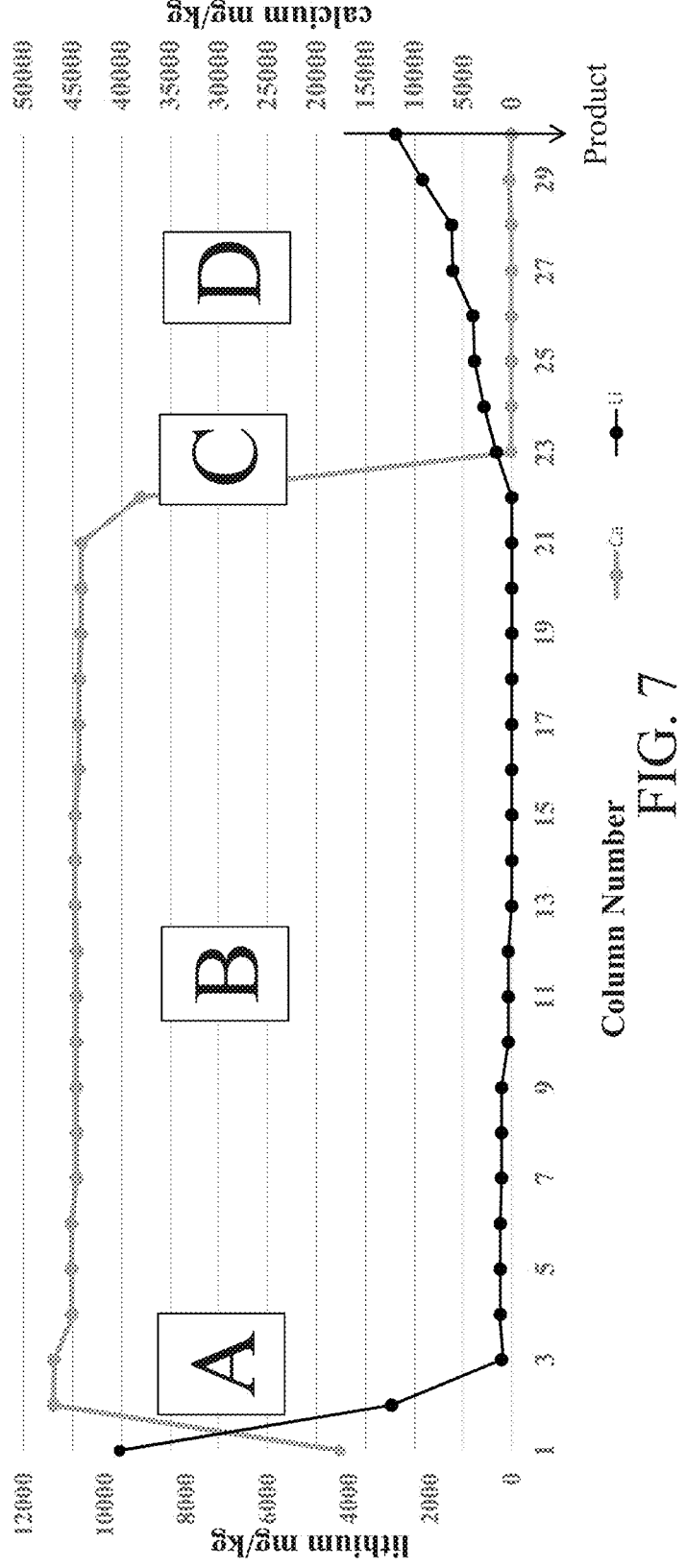
FIG. 7 is a graphical representation illustrating lithium and calcium concentrations taken at an underflow of each adsorption column of a CCAD lithium recovery unit under a standing-wave steady state operating condition in accordance with an illustrative embodiment of the invention disclosed herein.

In addition, similar to the first example and as illustrated in FIG. 7, the inventive CCAD circuit 400 provides excellent results for the preparation of a lithium chloride product having low calcium and magnesium concentrations, which is particularly suited as a feedstock for a SX/EW process, a SX/EL process, or other recovery technology process for production of high purity lithium hydroxide and lithium carbonate for battery production. The feed brine contained 29,770 mg/kg of calcium yet the lithium product stream contained only 403 mg/kg of calcium, representing a 99.98% rejection of calcium from the feed brine to the lithium product stream. Magnesium rejection was similar to calcium rejection giving indication that the inventive process could be well suited to salar, continental, petro-, or other non-geothermal feedstock brines.

The CCAD circuit 400 having only one multi-port valve is far simpler to operate than classical continuous fixed bed systems having 50-60 valves. In addition to the high lithium yields, the CCAD circuit 400 also uses absorbent, water, and reagents more efficiently than fixed bed systems. In the above examples, the CCAD circuit 400 requires only about half the volume absorbent as a comparable classical fixed bed system.

Turn back now to FIG. 2, after leaving the CCAD circuit 400, the enhanced lithium chloride product stream 342 (stream 57 in FIG. 4A) (stream 417 or stream 420 in FIG. 5) is passed to the lithium chloride conversion circuit 500 where the lithium concentration is further increased to in excess of about 3,000 ppm. The lithium chloride conversion circuit 500 removes selected remaining impurities and further concentrates lithium in the lithium chloride product stream 342 before crystallization or electrolysis.

The lithium chloride conversion circuit 500 initially removes any remaining impurities 502, namely calcium, magnesium and boron, from the lithium chloride product stream 342. First, sodium hydroxide (caustic soda) is added in order to precipitate calcium and magnesium oxides from the lithium chloride product stream 342. The precipitated solids can produce a Ca/Mg filter cake 504. Boron is then removed by passing the lithium chloride product stream 342 through a boron ion exchange (IX) circuit 528. The boron IX circuit is filled with an adsorbent that preferentially attracts boron, and divalent ions (essentially calcium and magnesium) are further removed in a divalent ion exchange (IX) circuit 530. This "polishing" step 502 ensures that these calcium, magnesium and boron contaminants do not end up in the lithium carbonate or lithium hydroxide crystals.

Then, the lithium chloride conversion circuit 500 uses a reverse osmosis membrane step 506 to initially concentrate lithium in the lithium product stream 342 (target estimate from approximately 3,000 ppm to 5,000 ppm). A triple effect evaporator 508 is then used to drive off water content and further concentrate the lithium product stream. The triple effect evaporator 508 utilizes steam 510 from geothermal operations and/or fuel boiler to operate. After processing through the evaporator 508, lithium concentration in the product stream is increased from about 5,000 ppm to about 30,000 ppm.

The next steps in the lithium chloride conversion circuit 500 convert the lithium chloride in solution to a lithium carbonate crystal. Sodium carbonate is added 512 to the lithium chloride product stream 342 to precipitate lithium carbonate 514. The lithium carbonate 514 slurry is sent to a centrifuge 516 to remove any excess moisture resulting in lithium carbonate cake. The lithium carbonate cake is re-dissolved 518, passed through a final purification or impurity removal step 520, and recrystallized 522 with the addition of carbon dioxide 524. The crystallized lithium carbonate product is then suitable for packaging 527.

Recovery of Lithium Hydroxide

FIG. 3 illustrates another exemplary embodiment of the system and process 200 for recovery of lithium. After leaving the CCAD circuit 400, rather than using evaporation 508 exemplified in FIG. 2, a solvent extraction process 702 concentrates lithium in the enhanced lithium chloride product stream 342 in FIGS. 2 and 3 (stream 57 in FIG. 4A) (stream 417 or stream 420 in FIG. 5) using liquid-liquid separation, and after solvent extraction 702 and electrolysis 708, the lithium is subsequently crystallized 710 into lithium hydroxide product 712.

Similar to the embodiment illustrated in FIG. 2, the lithium chloride conversion circuit 500 first precipitates calcium and magnesium 502 through the addition sodium hydroxide (caustic soda) resulting with a Ca/Mg filter cake is produced 504. The pH of the lithium chloride product stream 342 is lowered to about 2.5 in step 700 and then the acidified lithium chloride product stream 342 is introduced to the solvent extraction step 702 in pulsed columns (tall vertical reaction vessels). The flow is scrubbed 704 and then stripped 706 with sulfuric acid producing a lithium sulfate product. The lithium sulfate product goes through an electrolysis unit 708 producing lithium hydroxide crystals 710. The lithium hydroxide crystals are then dried and packaged 712.

Selective Recovery of Zinc, Manganese and Lithium

Figure 4B:
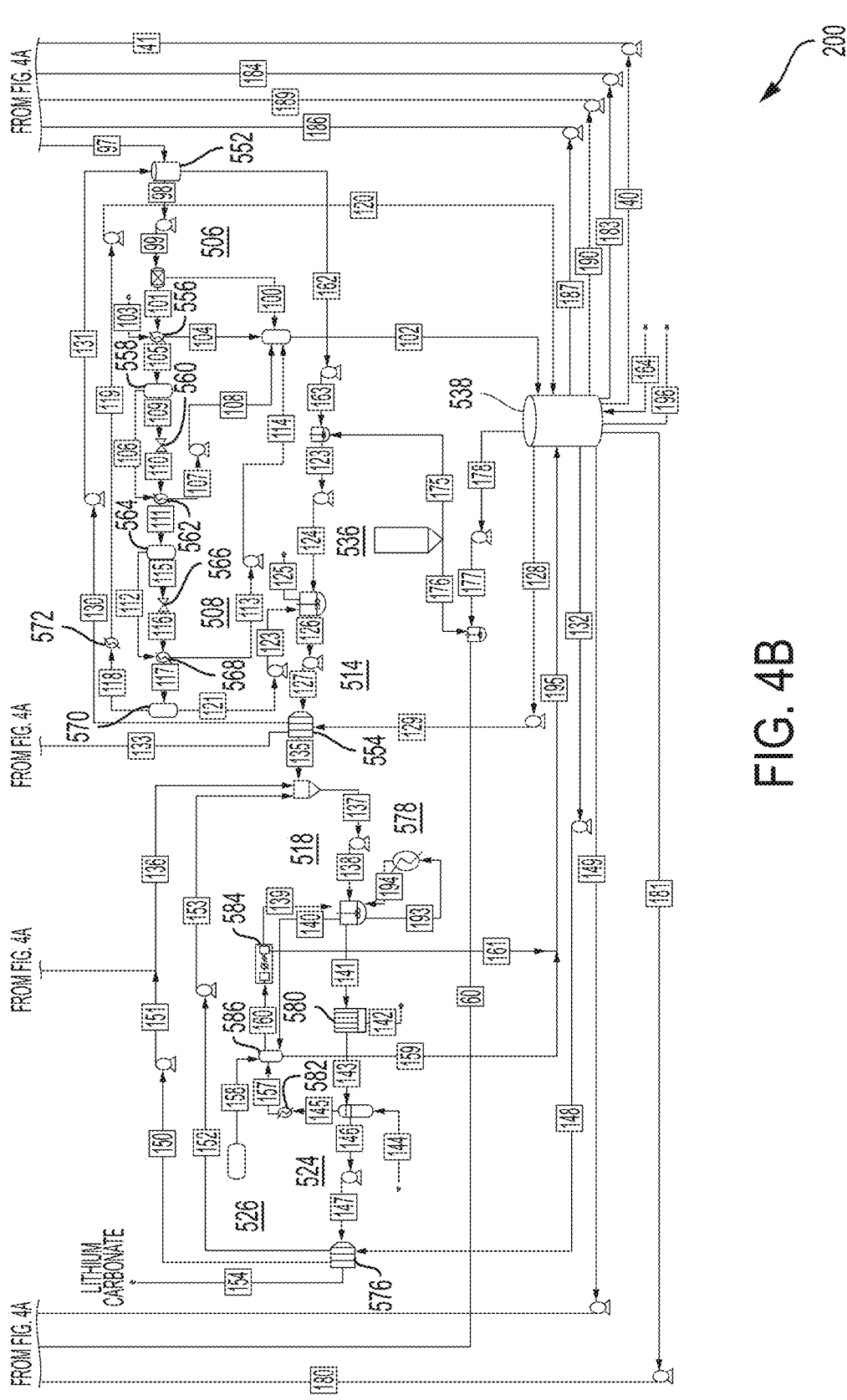
FIG. 4B is a continuation of the process flow diagram shown in FIG. 4A.

Turning now to FIG. 4 illustrating yet another exemplary embodiment of the process for recovery of lithium, the feed source is an incoming brine (e.g., a geothermal brine or the polished brine 1038) (stream 1) and dilution water (stream 2). The incoming dilution water (stream 2) is mixed with filtrate (stream 25) from a Fe/Si precipitate filter 322, then split, part (stream 21) being used as wash to the Fe/Si precipitate filter 322 and the balance (stream 3) being added to the incoming brine (stream 1). The combined brine, dilution water and Fe/Si filtrate (stream 4) is pumped (stream 5) to the Fe/Si precipitation stage 300A of the impurity removal circuit 300. Limestone 310A (stream 169) is slurried with recycled barren brine (stream 168). The limestone/recycled barren brine slurry is added (stream 6) to the first set of reaction tanks 302 along with recycled precipitate seed (stream 18). Air is injected (stream 7/8) into the first tank 302 using a blower 324. The iron is oxidized, and iron and silica are precipitated according to the following stoichiometry:

$$2CaCO_3+2Fe^{2+}+3H_2O+\tfrac{1}{2}O_2 \rightarrow 2Fe(OH)_3+2CO_2+2Ca^{2+}$$

$$3CaCO_3+3H_4SiO_4+2Fe(OH)_3 \rightarrow Ca_3Fe_2Si_3O_{12}+3CO_2+9H_2O$$

The spent air is vented (stream 9) from the first tanks 302, and the exit slurry (stream 10) is pumped (stream 11) to a thickener or clarifier 304 where flocculent (stream 12/13) is added and the solids are settled out. The underflow from the clarifier 304 (stream 15) is pumped (stream 16) back to the first set of reaction tanks 302 as seed (stream 17) and (stream 19) to the filter feed tank 326. Precipitate from the Ca/Mg precipitation stage 540 of the impurity removal circuit 502 is added (stream 73) and the combined slurry (stream 20) is filtered in the Fe/Si filter 322. The resulting Fe/Si filter cake is washed with dilution water (stream 22) and the washed filter cake 328 (stream 23) leaves the circuit 300. The filtrate (stream 24) is pump (stream 25) to the dilution water tank 330.

The clarifier overflow (stream 14) from the Fe/Si precipitation stage 300A is combined with filtrate from a Zn/Mn precipitate filter 332 (stream 45) in a feed tank 338 and the combined solution (stream 26) is pumped (stream 27) to the Zn/Mn precipitation stage 300B. Recycled precipitate (stream 38) is added as seed and lime 312B (stream 173) is slaked with recycled barren solution (stream 172). Any gas released is vented (stream 174). The lime/recycled barren solution is added (stream 28) to the second set of reaction tanks 306 to raise the pH to just over 8 and precipitate zinc, manganese and lead oxides/hydroxides.

Any gas released is vented (stream 29) from the second set of reaction tanks 306. The exit slurry (stream 30) is pumped (stream 31) to the clarifier 308. Recycled solids from a subsequent polishing filter 334 (stream 47) and flocculent (stream 32/33) are added and the precipitated hydroxides are settled out. The clarifier underflow (stream 35) is pumped (stream 36) to seed recycle (stream 37) and to the Zn/Mn precipitate filter 332 (stream 39). The resulting Zn/Mn filter cake is washed with process water (stream 41) and the washed filter cake 336 (stream 43) leaves the circuit 300. The filtrate (stream 44) is pumped (stream 45) to the feed tank 338 ahead of the Zn/Mn precipitation stage 300B. The clarifier overflow (stream 34) is mixed with mother liquor (stream 134) from a first precipitation of lithium carbonate 514 and the combined solution (stream 49) is pumped (stream 50) through the polishing filter 334 to capture residual solids. The captured solids are backwashed out (stream 46) and sent to the Zn/Mn precipitate clarifier 308.

The filtrate from the polishing filter 334 (stream 51) is mixed with spent eluant from the divalent IX circuit (stream 95) and hydrochloric acid 338 (stream 52/53) is added to reduce the pH to approximately 5.5. The resulting solution is cooled to approximately 185° F. in the mixing tank 340 and the cooled solution (stream 54) is passed through the CCAD circuit 400 in which the lithium chloride is selectively captured onto the lithium selective adsorbent. The resulting barren solution (stream 55) is pumped (stream 48) to a holding tank 343 from which it is distributed as follows:

to slurry the limestone to the Fe/Si precipitation stage 300A (stream 167);

to slake the lime to the Zn/Mn precipitation stage 300B (stream 171); and the balance (stream 165) is pumped away (stream 166) to be reinjected into the injection wells 320.

The loaded adsorbent is eluted with process water (stream 56) and the resulting eluate (stream 57) is pumped (stream 58) to a third set of reaction tanks 532 for addition impurity removal 502, initially calcium and magnesium precipitation. Sodium hydroxide 554 (stream 179) is dissolved in process water (stream 181) and added (stream 59) to the tanks 532. Sodium carbonate 536 (stream 176) is dissolved in process water (stream (177) pumped from a process water reservoir 538 and added (stream 60). A bleed of mother liquor (stream 156) from a second precipitation of lithium carbonate 524 and the spent regenerant from the boron IX circuit 528 (stream 192) are also treated in the Ca/Mg precipitation section of the lithium chloride conversion circuit 500. The alkali earth ions (mainly $Ca^{2+}$ and $Mg^{2+}$) are precipitated according to the following stoichiometry:

$$Mg^{2+}+2NaOH\rightarrow2Na++Mg(OH)_2$$

$$Ba^{2+}+2NaOH\rightarrow2Na^++Ba(OH)_2$$

$$Sr^{2+}+2NaOH\rightarrow2Na^++Sr(OH)_2$$

$$Ca^{2+}+Na_2CO_3\rightarrow2Na^++Ca(CO)_3$$

Any vapor evolved is vented (stream 61). The exit slurry (stream 62) is pumped (stream 63) to a thickener or clarifier 540, flocculent is added (stream 64/65) and the precipitate is settled out. The overflow (stream 68) is pumped (stream 69) through a polishing filter 542. The underflow (stream 66) is pumped (stream 67) to a mixing tank 544 where it joins the solids (stream 70) from the polishing filter 542 and the combined slurry (stream 72) is pumped (stream 73) back to the feed tank 326 ahead of the Fe/Si filter 322. The filtrate (stream 71) from the polishing filter 542 is pumped (stream 74) to a feed tank 546 ahead of the boron IX circuit 528.

The filtrate (stream 75) from the Ca/Mg precipitation section of the lithium chloride conversion circuit 500 is pumped (stream 76) through the boron IX circuit 528 in which boron is extracted onto an ion exchange resin. The loaded resin is stripped with dilute hydrochloric acid (stream 78) that is made from concentrated hydrochloric acid (stream 185), process water (stream 186) and recycled eluate (stream 80). The first 50% of the spent acid (stream 79), assumed to contain 80% of the boron eluted from the loaded resin, is mixed with similar spent acid from the subsequent divalent IX circuit 530 and recycled to the feed to the CCAD circuit 400 (stream 94). The balance of the spent acid (stream 80) is recycled to the eluant make-up tank and recycled (stream 77). The stripped resin is regenerated with dilute sodium hydroxide (stream 82) that is made from fresh sodium hydroxide (stream 188), process water (stream 189) and recycled regenerant (stream 84). The first 50% of the spent regenerant (stream 83) is recycled to the Ca/Mg precipitation section and the balance (stream 84) returns to a regenerant make-up tank 548 and is recycled (stream 81).

The boron-free product solution (stream 85) is pumped (stream 86) through divalent IX circuit 530 in which 99 percent of any remaining divalent ions (essentially only $Ca^{2+}$ and $Mg^{2+}$) are captured by the resin. The loaded resin is stripped with dilute hydrochloric acid (stream 88) that is made from fresh hydrochloric acid (stream 182), process water (stream 184) and recycled spent acid (stream 93). The first 50% of the spent acid (stream 91) joins the first half of the spent acid from the boron IX circuit 528 and the combined solution (stream 94) is sent back to the feed tank 340 ahead of the CCAD circuit 400. The balance of the spent acid (stream 93) goes back to an eluant make-up tank 550 and is recycled (stream 87). The stripped resin is converted back to the sodium form by regeneration with dilute sodium hydroxide (stream 89). The first 50% of the spent regenerant (stream 92), assumed to have regenerated 80% of the resin, joins the spent regenerant (stream 83) from the boron ion exchange stage and goes back (stream 191) to the Ca/Mg precipitation section. The balance of the spent regenerant (stream 90) returns to the regenerant make-up tank 548.

The purified solution (stream 96) is pumped (stream 97) to a feed tank 552 ahead of reverse osmosis 506 and mixed with wash centrate (stream 131) from a first lithium carbonate centrifuge 554. The combined solution is split, part (stream 162) being used to dissolve sodium carbonate and the balance (stream 98) being pumped (stream 99) through a reverse osmosis stage in which the water removal is manipulated to give 95 percent saturation of lithium carbonate in the concentrate (stream 101). The permeate goes to the process water reservoir (stream 100).

The partially concentrated solution from reverse osmosis 506 is further concentrated in a triple-effect evaporation 508. The solution ex reverse osmosis (stream 101) is partly evaporated by heat exchanger 556 with incoming steam (stream 103). The steam condensate (stream 104) goes to the process water reservoir 538, and the steam/liquid mixture to the heat exchanger 556 (stream 105) is separated in a knock-out vessel 558. The liquid phase (stream 109) passes through a pressure reduction 560 (stream 110) and is further evaporated in a heat exchanger 562 with steam (stream 106) from the first knock-out vessel 558. The condensate (stream 107) is pumped (stream 108) to the process water reservoir 538. The steam-liquid (stream 111) mixture is separated in a second knock-out vessel 564. The liquid (stream 115) goes through another pressure reduction step 566 (stream 116) and is evaporated further another heat exchanger 568 with steam (stream 112) from the second knock-out vessel 564. The condensate (stream 113) is pumped (stream 114) to the process water reservoir 538. The steam-liquid mixture (stream 117) is separated in a third knock-out vessel 570. The steam (stream 118) is condensed (stream 119) by heat exchanger 572 with cooling water and pumped (stream 120) to the process water reservoir 538.

The concentrated solution (stream 121) is pumped (stream 122) to the lithium carbonate crystallization section 514. Sodium carbonate 536 (stream 175) is dissolved in dilute lithium solution (stream 163) from the feed tank 552 ahead of reverse osmosis 506 and added (stream 123/124) to precipitate lithium carbonate. Any vapor evolved is vented (stream 125). The resulting slurry (stream 126) is pumped (stream 127) to a centrifuge in which the solution is removed, leaving a high solids cake. A small amount (stream 129) of process water is used to wash the solids. The wash centrate (stream 130) is returned to the feed tank ahead of reverse osmosis 506. The primary centrate (stream 133) is recycled to a feed tank 336 ahead of the polishing filter 334 before the CCAD circuit 400.

The washed solids (stream 135) from the first centrifuge 554 are mixed with wash (stream 136) and primary centrate (stream 153) from a second centrifuge 576. The resulting slurry (stream 137) is pumped to 15 bar abs. (stream 138) and contacted with pressurized carbon dioxide 526 (stream 139) to completely dissolve the lithium carbonate according to the following stoichiometry:

$$Li_2CO_3+CO_2+H_2O\rightarrow2Li^++2HCO_3^-$$

The amount of primary centrate is manipulated to give 95 percent saturation of lithium carbonate in the solution (stream 141) leaving the redissolution step 518. Any other species (Ca, Mg) remain as undissolved carbonates. The temperature of this step is held at 80° F. by heat exchange with chilled water 578 (stream 194 in, stream 193 out). The resulting solution of lithium bicarbonate (stream 141) is filtered 580 and the solid impurities leave the circuit 500 (stream 142). The filtrate (stream 143) is heated by live steam (stream 144) injection, to decompose the dissolved lithium bicarbonate to solid lithium carbonate and gaseous carbon dioxide:

$$2Li^+ + 2HCO_3^- \rightarrow Li_2CO_3\downarrow + CO_2\uparrow + H_2O$$

The carbon dioxide formed (stream 145) is cooled by chiller 582 (stream 157) and mixed with surplus carbon dioxide (stream 140) from the re-dissolution step 518 and make-up carbon dioxide 528 (stream 158) in a knock-out vessel 586 from which the condensed water (stream 159) is removed and the carbon dioxide (stream 160) is compressed 584 and returned (stream 139) to the lithium re-dissolution step 518. The slurry of purified lithium carbonate (stream 146) is pumped (stream 147) to the second centrifuge 576 in which it is separated and washed with process water (stream 148). The wash centrate (stream 152) is returned to the re-dissolution step 518. The primary centrate (stream 150) is pumped (stream 151) back to the Ca/Mg precipitation section (stream 155) and to the lithium re-dissolution step (stream 136). The washed solids (stream 154) leave the circuit as the lithium carbonate product.

The condensate from the carbon dioxide knock-out vessel 586 (stream 159) and condensate from the carbon dioxide compressor 584 (stream 161) are combined and sent (stream 195) to the process water reservoir 538. The permeate from the reverse osmosis 506 (stream 100) and the condensates from the evaporation sequence 508 (streams 104, 108, 14) also go to the process water reservoir 538. Make-up water (stream 164) is added to the process water reservoir 538, if necessary, to balance the following requirements for process water:

wash to the Zn/Mn precipitate filter 332 (stream 40); eluate to the CCAD circuit 400 (stream 149); centrifuge 554/576 wash water (streams 128/132); and reagent make-up water (streams 178/181/183/187/190).

Selective Recovery of Zinc and Manganese

Figure 6:
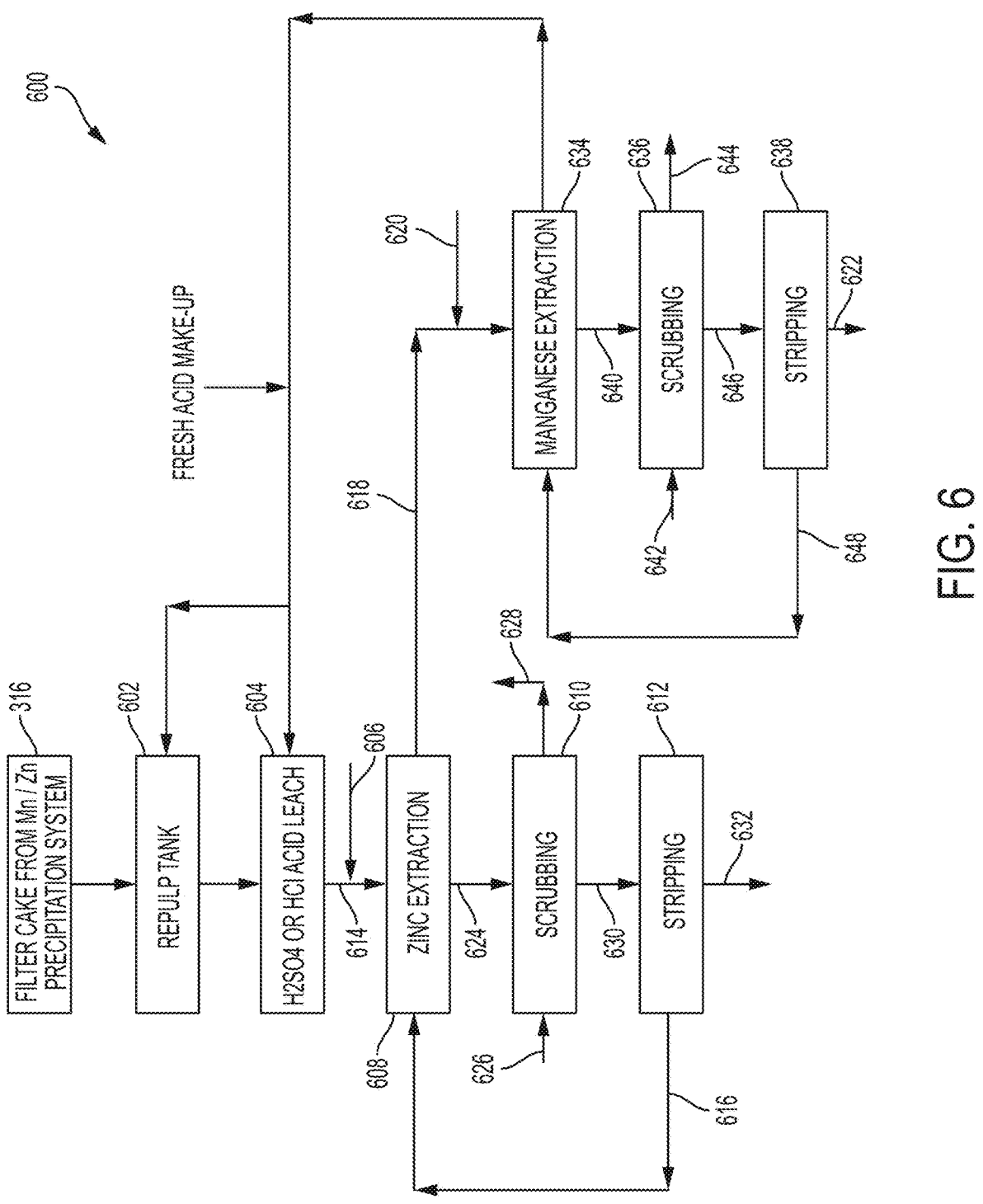
FIG. 6 is a flow chart of an example of zinc and manganese solvent extraction circuit in accordance with an illustrative embodiment of the invention disclosed herein.

FIG. 6 shows an illustrative example of mineral recovery as part of the system and process 200 disclosed herein. After the impurity removal circuit 300, the recovery of metals from the second filter cake 316 is possible through a solvent extraction (SX) circuit 600. The SX circuit leaches manganese and zinc from the filter cake with an application of an acid and then selectively strips the manganese and zinc using a solvent under different pH conditions. The resulting intermediate products are zinc sulfate liquor and manganese sulfate liquor, both of which can be sold as agricultural products, processed further by electrowinning into metallic form, or as feedstock to alternative products such as electrolytic manganese dioxide among others.

The SX circuit 600 begins with leaching 604 the second filter cake 316 in a stirred, repulp reactor 602 with sulfuric acid ($H_2SO_4$) or hydrochloric acid (HCl) to reduce the pH down to about 2.5 (606). A reducing agent such as NaHS or $SO_2$ is added to the reactor 602 to ensure all of the manganese is in the +2-valence state for leaching. This improves the kinetics and yield of the acid leach. The discharge from the leach reactor 602 will have its pH raised to approximately 5-6 with lime to precipitate any residual iron. The slurry will then be pumped to a polishing filter (not shown) followed by a pH adjustment to approximately 2 to approximately 3. This becomes the Zn/Mn aqueous feed solution 614 to the SX circuit 600.

The SX circuit 600 includes a zinc extraction stage 608, a zinc scrubbing stage 610, and a zinc stripping stage 612. The Zn/Mn aqueous feed solution 614 and an organic solvent 616 (e.g., Cytex 272) are fed in a counter-current manner into a first stage contactor in which the two phases are mixed and Zn is transferred from the aqueous phase into the organic phase. After settling, the aqueous raffinate is separated 618 and pH adjusted to between approximately 4.5 and approximately 5.5. After pH adjustment 620, the raffinate containing Mn 618 is sent for recovery of a manganese sulfate product liquor 622.

From the zinc extraction stage 608, the zinc loaded solvent 624 is fed into a second stage contactor where it is scrubbed with a suitable aqueous solution 626 to remove small amounts of impurities remaining. After settling in the zinc scrubbing stage 610, the scrub raffinate will be recycled to an appropriate stream 628. The loaded solvent 630 is then pumped to the zinc stripping stage 612 and fed into a third stage contactor in which the Zn is stripped from the organic phase by a sulfuric acid solution. The aqueous concentrated strip ZnSO4 product liquor 632 then goes for further processing depending on the desired product form. The stripped solvent 616 is recycled back to the zinc extraction stage 608.

The SX circuit 600 includes a manganese extraction stage 634, a manganese scrubbing stage 636, and a manganese stripping stage 638. Similar to the zinc SX circuit, the raffinate containing Mn 618 and an organic solvent 648 (e.g., Cytex 272) are fed in a counter-current manner into a first stage contactor in which the two phases are mixed and Mn is transferred from the aqueous phase into the organic phase. The manganese loaded solvent 640 is fed into a second stage contactor where it is scrubbed with a suitable aqueous solution 642 to remove small amounts of impurities remaining. After settling in the manganese scrubbing stage 636, the scrub raffinate will be recycled to an appropriate stream 644. The loaded solvent 646 is then pumped to the manganese stripping stage 638 and fed into a third stage contactor in which the Mn is stripped from the organic phase by a sulfuric acid solution. The aqueous concentrated strip MnSO4 product liquor 622 then goes for further processing depending on the desired product form. The stripped solvent 648 is recycled back to the manganese extraction stage 634.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Systems and processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed:

1. A continuous countercurrent adsorption and desorption process for recovery of an enhanced lithium product solution from a lithium-containing brine solution, said process comprising the cyclical and sequential steps of:

pumping fluid flow through a continuous countercurrent adsorption and desorption circuit comprising an adsorption displacement zone, an adsorption loading zone, an entrainment rejection zone, and an elution zone, each of said zones comprising one or more adsorbent beds or columns having a lithium selective adsorbent; said process further comprising:

a) recycling a portion of a lithium product eluate from the elution zone to the adsorption displacement zone and displacing residual feed brine from the one or more adsorbent beds or columns in the adsorption displacement zone to form a displacement feed brine;

b) pumping the displacement feed brine from the adsorption displacement zone and the lithium-containing brine solution through the adsorption loading zone to adsorb lithium in the displacement feed brine and the lithium-containing brine solution on the lithium selective adsorbent in the one or more adsorbent beds or columns and form a lithium-depleted brine raffinate;

c) pumping the lithium-depleted brine raffinate from the adsorption loading zone through the entrainment rejection zone and displacing a latent eluate solution from the one or more adsorbent beds or columns in said entrainment rejection zone using a portion of said lithium-depleted brine raffinate;

d) pumping said displaced latent eluate solution and a portion of an eluant solution through said elution zone to desorb a portion of the lithium on the lithium selective adsorbent in the one or more adsorbent beds or columns and form said lithium product eluate; and e) collecting a portion of said lithium product eluate as an enhanced lithium product solution.

2. The process of claim 1 wherein said elnant solution comprises lithium chloride and water at a concentration of up to about 1000 mg/kg lithium.

3. The process of claim 1 further comprising recovering lithium from said enhanced lithium product solution.

4. The process of claim 3 further comprising selectively converting said recovered lithium to lithium carbonate, lithium hydroxide, or both.

5. The process of claim 3 further comprising dewatering said enhanced lithium product solution using membrane separation.

6. The process of claim 5 wherein said membrane separation comprises reverse osmosis or nanofiltration.

7. The process of claim 6 wherein said dewatered enhanced lithium product solution has a concentration from about 3000 to about 5000 mg/kg lithium.

8. The process of claim 5 further comprising concentrating said dewatered enhanced lithium product solution to produce a high lithium concentration, enhanced lithium product solution and a recycle eluant solution.

9. The process of claim 8 further comprising providing said enhanced lithium product solution, said high lithium concentration, enhanced lithium product solution, or both to a lithium solvent extraction and electrowinning process, a solvent extraction and membrane electrolysis process, or a recovery process for production of high purity lithium hydroxide and lithium carbonate for battery production.

10. The process of claim 8 wherein said dewatered and concentrated enhanced lithium product solution has a concentration from about 5000 to about 30000 mg/kg lithium.

11. The process of claim 3 wherein said enhanced lithium product solution has a concentration of greater than 3000 mg/kg lithium.

12. The process of claim 1 wherein said lithium-containing brine solution comprises a natural brine, a synthetic brine, a polished brine, or a combination thereof.

13. The process of claim 1 wherein said lithium-containing brine solution comprises a continental brine, a geothermal brine, an oil field brine, a brine from hard rock lithium mining, or a combination thereof.

14. The process of claim 1 wherein said lithium selective adsorbent is a lithium alumina intercalate prepared from hydrated alumina, a lithium aluminum layered double hydroxide chloride, a layered double hydroxide modified activated alumina, a layered double hydroxide imbibed ion exchange resin or copolymer or molecular sieve or zeolite, layered aluminate polymer blends, a lithium manganese oxide, a titanium oxide, an immobilized crown ether, or a combination thereof.

15. The process of claim 1 wherein said continuous countercurrent adsorption and desorption circuit comprises a multi-port valve system.

16. The process of claim 15, wherein the multi-port valve system is a rotary multi-port valve system.

17. The process of claim 16 wherein said fluid flow through said adsorption displacement zone, said adsorption loading zone, said entrainment rejection zone, and said elution zone of said continuous countercurrent adsorption and desorption circuit is controlled by pumping flow rates, predetermined indexing, or a combination of both of said rotary multi-port valve system.

18. The process of claim 17 wherein:

said adsorption displacement zone is positioned upstream with respect to fluid flow of said adsorption loading zone;

said adsorption loading zone is positioned upstream with respect to fluid flow of and in fluid communication with said entrainment rejection zone;

said entrainment rejection zone positioned upstream with respect to fluid flow of and in fluid communication with said elution zone; and said elution zone in fluid communication with said adsorption displacement zone.

19. The process of claim 18 further comprising passing said lithium-containing brine solution through said adsorption loading zone for a predetermined amount of contact time.

20. The process of claim 17 further comprising pumping said fluid flow through said adsorption displacement zone, said adsorption loading zone, said entrainment rejection zone, and said elution zone of said continuous countercurrent adsorption and desorption circuit in a direction countercurrent to the predetermined indexing of said adsorbent beds or columns through said adsorption displacement zone, said adsorption loading zone, said entrainment rejection zone, and said elution zone of said continuous countercurrent adsorption and desorption circuit.

21. The process of claim 1 wherein said eluant solution comprises lithium chloride and water at a concentration of up to about 1000 mg/kg lithium and at temperatures of about 5° C. to about 100° C.

22. A continuous countercurrent adsorption and desorption process for recovery of an enhanced lithium product solution from a lithium-containing brine solution, said process comprising:

1) pumping fluid flow cyclically and sequentially through a continuous countercurrent adsorption and desorption circuit comprising a multi-port valve system having a plurality of process zones, said process zones comprising an adsorption displacement zone, an adsorption loading zone, an entrainment rejection zone, and an elution zone, each of said process zones comprising one or more adsorbent beds or columns having a lithium selective adsorbent, said pumping fluid flow through said adsorption displacement zone, said adsorption loading zone, said entrainment rejection zone, and said elution zone is countercurrent relative to predetermined indexing of said adsorbent beds or columns through said adsorption displacement zone, said adsorption loading zone, said entrainment rejection zone, and said elution zone, introducing the lithium-containing brine solution into the adsorption loading zone; said process further comprising:

a) recycling a portion of a lithium product eluate from the elution zone to the adsorption displacement zone and displacing residual feed brine solution from the one or more adsorbent beds or columns in the adsorption displacement zone to form a displacement feed brine b) pumping said displacement feed brine from the adsorption displacement zone and the lithium-containing brine solution through the adsorption loading zone to adsorb a portion of lithium in said displacement feed brine and the lithium-containing brine solution on the lithium selective adsorbent in the one or more adsorbent beds or columns and form a lithium-depleted brine raffinate;

c) pumping the lithium-depleted brine raffinate from the adsorption loading zone through the entrainment rejection zone and displacing a latent eluate solution from the one or more adsorbent beds or columns in said entrainment rejection zone using a portion of said lithium-depleted brine raffinate;

d) pumping said displaced latent eluate solution and a portion of an eluant solution through said elution zone to strip a portion of the lithium adsorbed on the lithium selective adsorbent in the one or more adsorbent beds or columns and form a lithium product eluate; and e) collecting a portion of said lithium product eluate as an enhanced lithium product solution.

23. The process of claim 22 wherein said eloant solution comprises lithium chloride and water at a concentration of up to about 1000 mg/kg lithium.

24. The process of claim 22 further comprising recovering lithium from said enhanced lithium product solution.

25. The process of claim 24 further comprising selectively converting said recovered lithium to lithium carbonate, lithium hydroxide, or both.

26. The process of claim 24 further comprising dewatering said enhanced lithium product solution using membrane separation.

27. The process of claim 26 wherein said membrane separation comprises reverse osmosis or nanofiltration.

28. The process of claim 27 wherein said dewatered enhanced lithium product solution has a concentration from about 3000 to about 5000 mg/kg lithium.

29. The process of claim 26 further comprising concentrating said dewatered enhanced lithium product solution to produce a high lithium concentration, enhanced lithium product solution and a recycle eluant solution.

30. The process of claim 29 further comprising providing said enhanced lithium product solution, said high lithium concentration, enhanced lithium product solution, or both to a lithium solvent extraction and electrowinning process, a solvent extraction and membrane electrolysis process, or a recovery process for production of high purity lithium hydroxide and lithium carbonate for battery production.

31. The process of claim 29 wherein said dewatered and concentrated enhanced lithium product solution has a concentration from about 5000 to about 30000 mg/kg lithium.

32. The process of claim 24 wherein said enhanced lithium product solution has a concentration of greater than 3000 mg/kg lithium.

33. The process of claim 22 wherein said lithium-containing brine solution comprises a natural brine, a synthetic brine, a polished brine, or a combination thereof.

34. The process of claim 22 wherein said lithium-containing brine solution comprises a continental brine, a geothermal brine, an oil field brine, a brine from hard rock lithium mining, or a combination thereof.

35. The process of claim 22 wherein said lithium selective adsorbent is a lithium alumina intercalate prepared from hydrated alumina, a lithium aluminum layered double hydroxide chloride, a layered double hydroxide modified activated alumina, a layered double hydroxide imbibed ion exchange resin or copolymer or molecular sieve or zeolite, layered aluminate polymer blends, a lithium manganese oxide, a titanium oxide, an immobilized crown ether, or a combination thereof.

36. The process of claim 22, wherein the multi-port valve system is a rotary multi-port valve system.

37. The process of claim 36 wherein said fluid flow through said adsorption displacement zone, said adsorption loading zone, said entrainment rejection zone, and said elution zone of said continuous countercurrent adsorption and desorption circuit is controlled by pumping flow rates, predetermined indexing, or a combination of both of said rotary multi-port valve system.

38. The process of claim 37 wherein:

said adsorption displacement zone is positioned upstream with respect to fluid flow of said adsorption loading zone;

said adsorption loading zone is positioned upstream with respect to fluid flow of and in fluid communication with said entrainment rejection zone;

said entrainment rejection zone positioned upstream with respect to fluid flow of and in fluid communication with said elution zone; and said elution zone in fluid communication with said adsorption displacement zone.

39. The process of claim 38 further comprising passing said lithium-containing brine solution through said adsorption loading zone for a predetermined amount of contact time.

40. The process of claim 22 wherein said eluant solution comprises lithium chloride and water at a concentration of up to about 1000 mg/kg lithium and at temperatures of about 5° C. to about 100° C.

* * * * *